Aug. 13, 1968 L. P. GOLONSKI 3,397,285

ELECTRONIC APPARATUS

Filed July 22, 1964

Inventor
LESLIE P. GOLONSKI

By Mueller & Aichele

Attys.

United States Patent Office 3,397,285

Patented Aug. 13, 1968

3,397,285

ELECTRONIC APPARATUS

Leslie P. Golonski, Hanover Park, Ill., assignor to Motorola, Inc., Franklin Park, Ill., a corporation of Illinois Filed July 22, 1964, Ser. No. 384,414
7 Claims. (Cl. 179—1)

ABSTRACT OF THE DISCLOSURE

A variable compression and expansion circuit for an audio amplifier incorporates separate compression and expansion circuits having inputs coupled to the output of the amplifier. A resistor having a variable tap is coupled between the outputs of the compression and expansion circuits to control a negative feedback signal used for regulating the gain of the amplifier.

In certain types of electrical signal amplification systems, it may be desirable under some circumstances to effect amplitude expansion or amplitude compression. For example, audio intelligence is often broadcast or recorded with a certain amount of compression or expansion introduced at the studio. It is desirable that some means be provided in the reproducing apparatus for restoring the true dynamic range of the broadcast or recorded material. Another circumstance wherein audio compression may be useful is where the overall volume setting of audio reproduction apparatus is low for reproducing background music. The soft passages of such music may be inaudible, or if the volume setting is increased to make them audible, the loud passages of the music may be objectionably loud. By compressing the amplitude, the dynamic range of the music is reduced to within desired limits.

It has heretofore been proposed to provide means for selectively effecting amplitude expansion and amplitude compression in receiving or reproducing apparatus. Such systems, however, have not been satisfactory in that the degree of expansion or compression effected may not correspond to the compression or expansion of the signal being received or reproduced. It is desirable therefore that some means be provided for accomplishing continuously variable amounts of either expansion or compression in an economical and simple manner so that it may be easily incorporated into popular consumer items for home use.

Accordingly, it is an object of this invention to provide an electrical signal amplifier system wherein varying degrees of amplitude expansion or compression may be accomplished by means of a single control.

Still another object of the invention is to provide an improved audio expansion and compression system.

A feature of the invention is the provision of an audio compressor circuit and an audio expander circuit connected in parallel with a variable resistor connected to effect varying degrees of amplitude compression or expansion according to the setting of the resistor.

Another feature of the invention is the provision of amplifier means with a pair of oppositely oriented resistor-light bulb series combinations connected in parallel with each other across the amplifier, and of a variable resistor connecting the respective junctures between the series connected elements with the variable resistor having an adjustable tap for selecting a desired degree of expansion or compression.

In accordance with the invention, a signal amplitude expansion circuit has an input connected to an amplifier and has an output providing a signal having an amplitude which increases at an increasing rate with increasing amplitude of the signal at the input thereof. A signal amplitude compression circuit is also connected to the amplifier and has an output providing a signal having an amplitude which increases at a decreasing rate with increasing amplitude of the signal at the input. A resistor is connected between the output of the expansion circuit and the output of the compression circuit. The resistor has an adjustable tap connected to the amplifier and applies a signal thereto affecting the amplitude of the output signal of the amplifier according to the amplitude of the applied signal. The adjustable tap thereby provides control of the relative effects of the expansion and compression circuits on the output signal of the amplifier. The variable tap may either be series connected in the direct signal path of the amplifier, or may be connected to feed back signals from the output of the amplifier to the input thereof.

Figures 1, 2, 3:
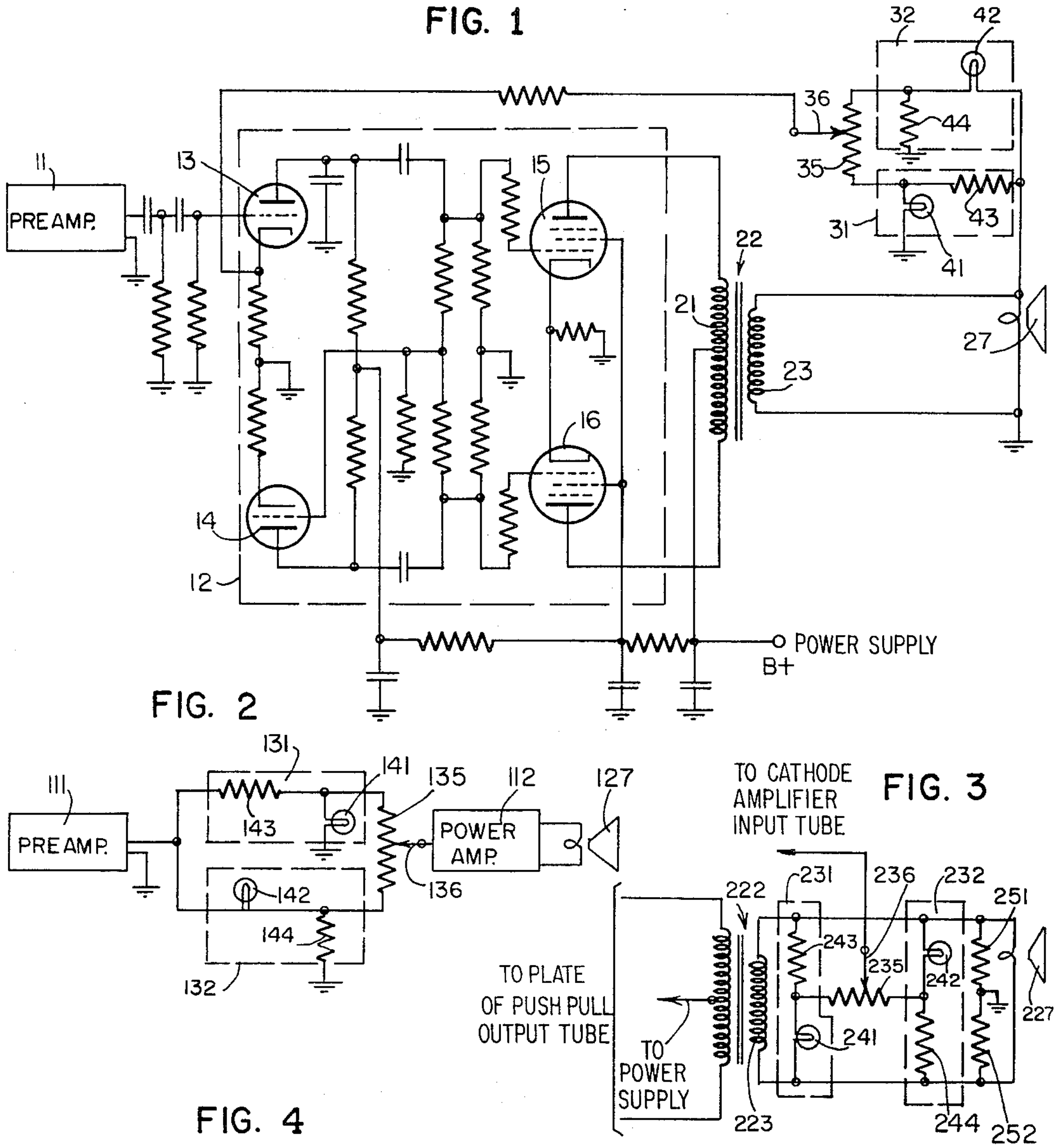
FIG. 1 is a schematic diagram of a circuit constructed in accordance with the invention.
FIG. 2 is a schematic diagram of an alternative embodiment of the invention.
FIG. 3 is a schematic diagram of another alternative embodiment of the invention.

Referring now more particularly to FIG. 1, an electrical signal system constructed in accordance with the invention is shown. The circuit shown is for an audio signal reproduction system and includes a pre-amplifier 11 which feeds signals to a push-pull power amplifier 12.

Power amplifier 12 includes a first stage triode 13, and a phase inverter triode 14. The outputs of triodes 13 and 14 are fed through appropriate circuitry to the respective grids of push-pull connected pentodes 15 and 16. The plate voltages of tubes 15 and 16 are fed across respective halves of a primary winding 21 of output transformer 22 to develop a signal across secondary winding 23 and drive speaker 27.

A pair of compressor-expander units 31 and 32 are each connected to one end of the secondary winding 23. Unit 31 acts as an expander and unit 32 as a compressor. A variable resistor 35 is connected between the two units 31 and 32 and includes an adjustable tap 36 which is connected to negatively feed back the compressed or expanded signals produced by units 31 and 32. Since the feedback is negative, it will be seen that amplitude expansion caused by unit 31 will result in an overall amplitude compression, and compression caused by unit 32 will result in expansison of the audio output of the speaker 27.

Units 31 and 32 are each comprised of a suitable light bulb 41 and 42 respectively, and fixed resistors 43 and 44 respectively. Bulbs 41 and 42 operate as non-linear resistors with respect to the average power applied thereto, but respond linearly to the instantaneous level of the applied signal. The bulbs increase in resistance with an increase in signal applied so that the resistance of each is higher with a higher average signal. In unit 31 the signal is derived across the bulb 41 resulting in an increase in the signal fed back (degeneratively) and in unit 32 the signal is derived across fixed resistor 44 so the signal fed back (degeneratively) decreases in level with a rise in average level. Furthermore, the resistance of bulbs 41 and 42 rises quickly in response to increased power as compared with the time it takes for the resistance to respond to decreased power. Such action is desirable in amplitude compression and expansion.

Adjustable tap 36 on resistor 35 provides a continuously variable control for altering the amount of expansion and compression in the circuit. With variable tap 36 positioned at the lowest position on resistor 35, maximum compression of the signal will result. As tap 36 is moved to the middle of resistor 55, compression will lessen until the action of respective units 31 and 32 cancel each other, resulting in neither compression nor expansion. As tap 36 is moved to the uppermost position, expansion will increase to a maximum.

Figure 4:
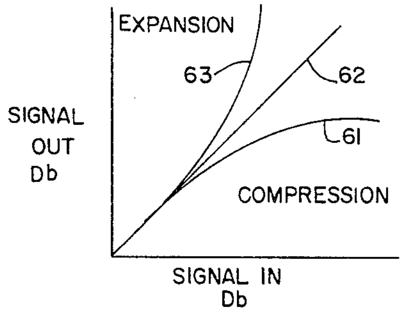
FIG. 4 is a graph illustrating the operation of the circuits of FIGS. 1 and 2.

The above described operation is illustrated in FIG. 4. The lower curve 61 represents the maximum compression positions, the middle curve 62, the middle position of the tap, and the upper curve 63 the maximum expansion setting of the tap. Accordingly, the action of the system extends from full expansion, continuously through no action (cancellation), to full compression. The low level or nominal sensitivity of the amplifier remains virtually constant over the entire travel of the tap 36.

FIG. 2 illustrates another embodiment of the invention wherein the expansion and compression units are used to directly affect the signal, and not to affect the amount of negative feedback as in FIG. 1. Pre-amplifier 111 is connected to the inputs of expansion-compression units 131 and 132, comprised respectively of light bulb 141 and resistor 143, and light bulb 142 and resistor 144. Unit 131 provides amplitude expansion and unit 132 provides amplitude compression, and they are connected by a variable resistor 135, and an adjustable tap 136, to the input of power amplifier 112. Power amplifier 112 drives a speaker 127. The overall effect of units 131 and 132 on the system is reversed from that of the compression-expansion units of FIG. 1, because units 131 and 132 are used to directly affect the signal rather than to alter the negative feedback. Nevertheless, the results are similar and the movement of variable tap 136 along resistor 135 will effect a variation of the type illustrated in FIG. 4.

In FIG. 3, a further way of achieving the results illustrated in FIG. 4 is shown. This circuit is for use with an amplifier circuit such as is shown in FIG. 1, and comprises a bridge connection of compression-expansion units 231 and 232. Here the serial combination of light bulb 241 and resistor 243 is connected in parallel with the serial combination of resistor 242 and light bulb 244, across secondary winding 223 of transformer 222. A pair of serial resistors 251 and 252 are connected across winding 223 and have their juncture grounded, effectively grounding the mid-points of the bridge network. Speaker 227 is driven by the amplifier. Variable resistor 235 connects the respective junctures between the light bulbs and resistors in the compression-expansion units. The adjustable tap 236 is connected to the cathode of the amplifier input tube to feedback signals derived across the bridge. Thus, as adjustable tap 236 is moved across the length of resistor 235, from left to right in the drawing, the circuit will cause first maximum compression, then a decrease in compression until there is neither compression nor expansion, and finally an increase in expansion to a maximum level.

It may therefore be seen that the invention provides an amplitude expansion-compression system which is infinitely variable from maximum expansion to maximum compression through the use of a single variable resistor.

I claim:

1. An electrical signal amplifier system, including in combination, amplifier means providing an output signal, a signal amplitude expansion circuit having an input connected to said amplifier means for translating signals therefrom, said expansion circuit having an output and providing a signal at said output thereof having an amplitude which increases at an increasing rate with increasing amplitude of the signal at said input thereof, a signal amplitude compression circuit having an input connected to said amplifier means for translating signals therefrom, said compression circuit having an output and providing a signal at said output thereof having an amplitude which increases at a decreasing rate with increasing amplitude of the signal at said input thereof, and a variable resistor connected between said output of said expansion circuit and said output of said compression circuit, said resistor having an adjustable tap connected to said amplifier, said resistor acting to combine the signals from said expansion circuit and said compression circuit output portions according to the setting of said adjustable tap and to apply said combined signal to said amplifier and to control the level of the output signal of the amplifier means thereby.

2. An electrical signal amplifier system including in combination, amplifier means providing an output signal, said amplifier means having a first circuit portion for deriving signals translated thereby which are representative of the output signal, and a second circuit portion to which each signal representative of the translated signal may be applied for effect on the level of the output signal of said amplifier means, a signal amplitude expansion circuit having an input connected to said first circuit portion, said expansion circuit having an output and providing a signal at said output thereof having an amplitude which increases at an increasing rate with increasing amplitude of the signal at said input thereof, a signal amplitude compression circuit having an input connected to said first circuit portion, said compression circuit having an output and providing a signal at said output thereof having an amplitude which increases at a decreasing rate with increasing amplitude of the signal at said input thereof, and a variable resistor connected between said output of said expansion circuit and said output of said compression circuit, said variable resistor having an adjustable tap connected to said second portion, said resistor acting to combine the signals from said expansion circuit and said compression circuit output portions according to the setting of said adjustable tap and to apply said combined signals to said second portion and to control the level of the output signal of said amplifier means thereby.

3. An electrical signal amplifier system including in combination, amplifier means providing an output signal, said amplifier means having a first circuit portion for deriving signals translated by said amplifier means which are representative of the output signal, said amplifier means further having a second circuit portion to which a signal representative of the translated signal may be applied for effecting the level of the output signal of said amplifier means, a first fixed resistor and a first non-linear resistor serially connected in stated order between said first circuit portion and a reference potential, a second non-linear resistor and a second fixed resistor serially connected in stated order between said first circuit portion and a reference potential, said first and second non-linear resistors each increasing in value at a decreasing rate with increasing amplitude of the signal applied thereto, and a variable resistor connected between the respective junctures of said first resistor and said first non-linear resistor, and said second fixed resistor and said second non-linear resistor, said variable resistor having an adjustable tap connected to said second circuit portion of said amplifier means.

4. An electrical signal amplifier system including in combination, amplifier means providing an output signal, said amplifier means having a first circuit portion for deriving signals translated by said amplifier means which are representative of the output signal, said amplifier means further having a second circuit portion to which a signal representative of the translated signal may be applied for effect on the level of the output signal of said amplifier means, a first fixed resistor and a first light bulb serially connected in stated order between said first circuit portion and a reference potential, a second light bulb and a second fixed resistor serially connected in stated order between said first circuit portion and a reference potential, and a variable resistor connected between the respective junctures of said first fixed resistor and said first light bulb, and said second fixed resistor and said second light bulb, said variable resistor having an adjustable tap connected to said second circuit portion for applying signals thereto to control the level of the output signal of said amplifier means thereby.

5. In an electrical signal system having amplifier means providing an output signal, a signal amplitude expansion circuit having an input connected to said amplifier means, said expansion circuit having an output and providing a signal at said output thereof having an amplitude which increases at an increasing rate with increasing amplitude of the output signals of the amplifier means, a signal amplitude compression circuit having an input connected to the amplifier means, said compression circuit having an output and providing a signal at the output thereof having an amplitude which increases at a decreasing rate with increasing amplitude of the output signal of said amplifier means, a resistor connected between said output of said expansion circuit and said output of said compression circuit, said resistor acting to combine the signals from said expansion circuit and said compression circuit, said resistor including a variable tap, said signals from said expansion circuit and said compression circuit being combined in proportions according to the setting of said variable tap, said variable tap being connected to the input of the amplifier means for feeding back said combined signal thereto and providing control of the relative effects of said expansion and compression circuits on the output signal of the amplifier means.

6. An audio signal system including in combination, a push-pull amplifier, transformer means connected to said push-pull amplifier and having a secondary winding with said push-pull amplifier deveolping a signal of alternating polarity across said secondary winding, resistance means connected across said secondary winding and having a central point connected to a reference potential, loud speaker means having a voice coil connected across said secondary winding, a first fixed resistor and a first light bulb serially connected across said secondary winding, a second light bulb and a second fixed resistor serially connected across said secondary winding, said first resistor and said first light bulb being disposed in opposite order from said second resistor and said second light bulb, and a variable resistor connected between the respective junctures of said first and second light bulbs and said first and second fixed resistors, said variable resistor having an adjustable tap connected to the input of said push-pull amplifier to feed back a signal thereto, said adjustable tap thereby providing a control for selectively introducing varying amounts of amplitude expansion and compression in the signal being reproduced by said speaker means.

7. An electrical signal amplifier system including in combination, a pre-amplifier and a power amplifier, a signal amplitude expansion circuit having an input connected to said pre-amplifier, said expansion circuit having an output and providing a signal at the output thereof having an amplitude which increases at an increasing rate with increasing amplitude of the signal at said input thereof, a signal amplitude compression circuit having an input connected to said pre-amplifier, said compression circuit having an output and providing a signal at said output thereof having an amplitude which increases at a decreasing rate with increasing amplitude of the signal at said input thereof, and a variable resistor connected between said output of said expansion circuit and said output of said compression circuit, said variable resistor having an adjustable tap connected to said power amplifier, said resistor acting to combine the signals from said expansion and compression circuits in proportions according to the setting of said adjustable tap and to apply said combined signals to said power amplifier.

References Cited

UNITED STATES PATENTS

| | | | |
|---|---|---|---|
| 2,248,785 | 7/1941 | Roberts | 179—1 |
| 3,218,570 | 11/1965 | Godier | 330—143 |
| 3,213,391 | 10/1965 | Kovalevski et al. | 179—1 |
| 2,777,904 | 1/1957 | Milbourne | 330—143 |
| 2,378,620 | 6/1945 | Chattertea et al. | 325—415 |
| 2,237,448 | 4/1941 | Reinhard | 179—1 |
| 2,183,609 | 12/1939 | Foster | 325—400 |

KATHLEEN H. CLAFFY, *Primary Examiner.*

R. P. TAYLOR, *Assistant Examiner.*